July 31, 1923. Re. 15,664

E. H. OLSON ET AL.

AUTOMATIC TRAIN CONTROLLING APPARATUS

Original Filed Feb. 5, 1918 4 Sheets-Sheet 1

E. H. OLSON
J. C. H. CLARK
M. B. MERLEY AND
C. PELTER
INVENTORS

BY E. E. Sauze
ATTORNEY

July 31, 1923. Re. 15,664

E. H. OLSON ET AL

AUTOMATIC TRAIN CONTROLLING APPARATUS

Original Filed Feb. 5, 1918 4 Sheets-Sheet 2

E. H. OLSON
J. C. H. CLARK
M. B. MEALEY AND
C. PELTER
INVENTOR.

BY E. E. Sayre
ATTORNEYS.

July 31, 1923. Re. 15,664

E. H. OLSON ET AL

AUTOMATIC TRAIN CONTROLLING APPARATUS

Original Filed Feb. 5, 1918 4 Sheets-Sheet 3

E. H. OLSON
J. C. H. CLARK
M. B. MEALEY AND
C. PELTER
INVENTOR.

BY E. E. Sauze
ATTORNEYS.

July 31, 1923. Re. 15,664

E. H. OLSON ET AL

AUTOMATIC TRAIN CONTROLLING APPARATUS

Original Filed Feb. 5, 1918 4 Sheets-Sheet 4

E. H. OLSON
J. C. H. CLARK
M. B. MEALEY
C. PELTER
INVENTOR.

BY E. E. Sayre
ATTORNEYS.

Reissued July 31, 1923. Re. 15,664

UNITED STATES PATENT OFFICE.

EDWARD H. OLSON, JAMES C. H. CLARK, MERL B. MEALEY, OF WALLA WALLA, WASHINGTON; AND CHARLES PELTER, OF OREGON CITY, OREGON.

AUTOMATIC TRAIN-CONTROLLING APPARATUS.

Original No. 1,366,568, dated January 25, 1921, Serial No. 215,513, filed February 5, 1918. Application for reissue filed February 8, 1923. Serial No. 617,877.

*To all whom it may concern:*

Be it known that we, EDWARD H. OLSON, JAMES C. H. CLARK, MERL B. MEALEY, and CHARLES PELTER, citizens of the United States, the first three named residing at Walla Walla, in the county of Walla Walla, State of Washington, and the last named residing at Oregon City, county of Clackamas, State of Oregon, have invented a new and useful Automatic Train-Controlling Apparatus, of which the following is a specification.

The present invention relates to a train controlling apparatus, and aims to provide a novel and improved apparatus of that character for automatically arresting the movement of the train or vehicle when it enters or occupies a block, occupied by another train or which is otherwise rendered dangerous, the apparatus being operable for shutting off the motive power of the train and opening the brake pipe to the atmosphere, so that the brakes will be applied.

A further object of the invention is the provision of novel means for bringing the apparatus into operation automatically in case of emergency.

A further object of the invention is the provision of means whereby the engineer or operator can, after the automatic stopping means has operated, proceed with his hand on the throttle lever or other operating member controlling the power, thereby enabling the vehicle or train to proceed with caution, so that it can be stopped quickly if necessary.

The invention has for a still further object the provision of novel means for applying the brakes gradually.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawings, wherein—

Figure 1:
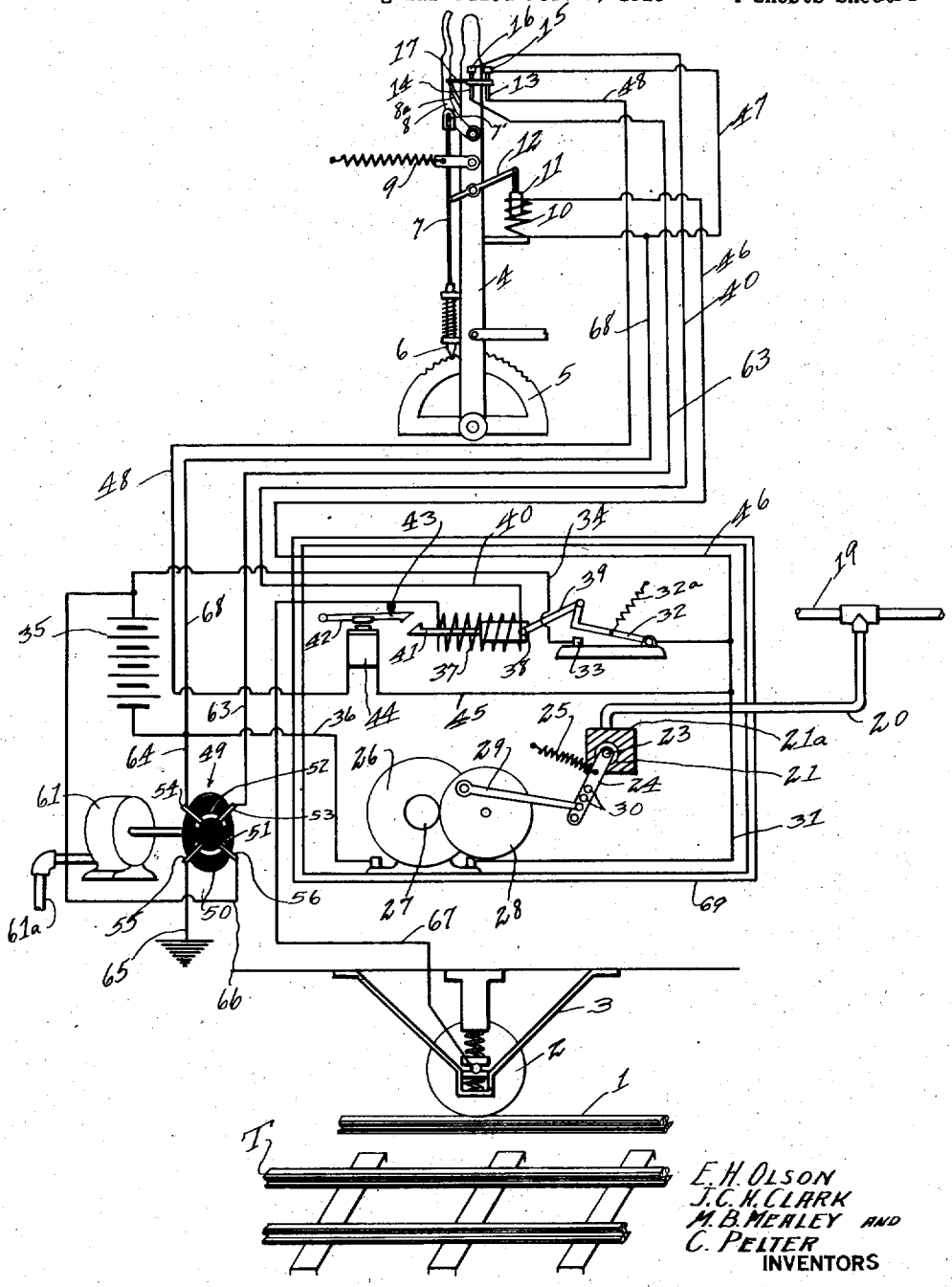
Figure 1 is a diagrammatical view of the apparatus.
Figure 6:
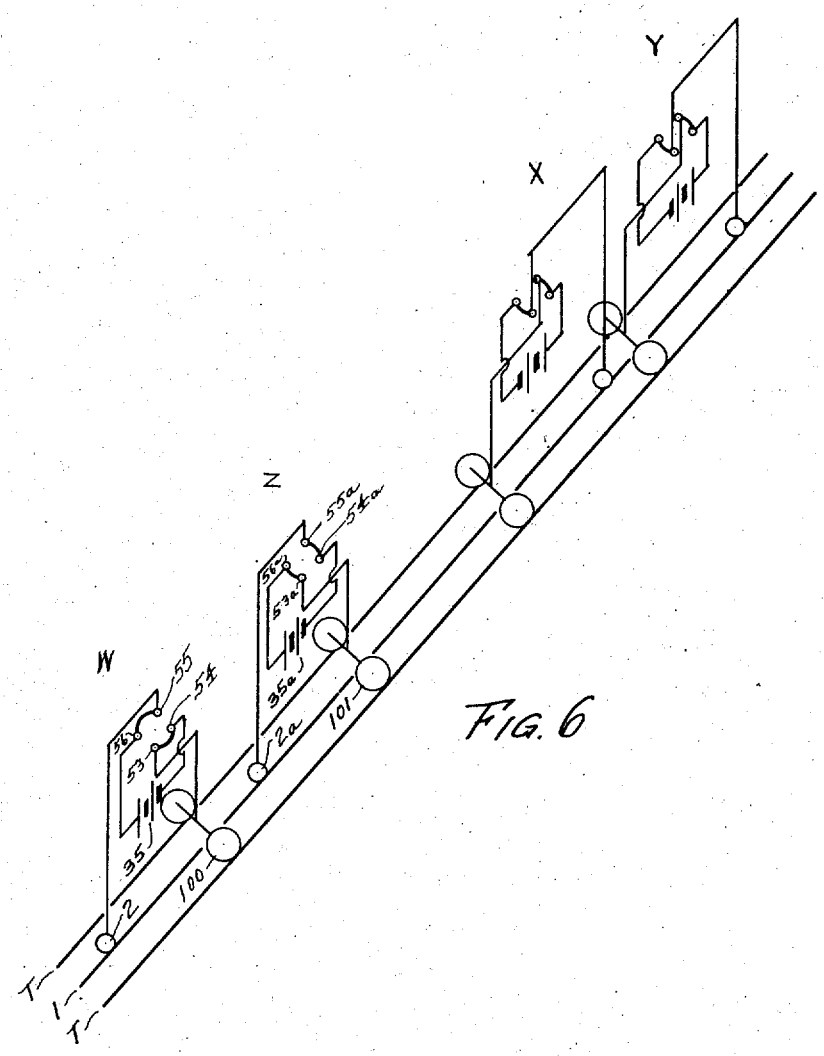
Fig. 6 is a view, in diagram, illustrating the manner in which two trains co-operate under the system disclosed in this application.

In carrying out the invention it must be understood that the track is divided into the usual well understood blocks, (not shown) each of which is insulated from the adjoining block for protection purposes in the usual manner, and that action of the device occurs only within the confines of a single block, therefore in conformity to this, the tracks shown and represented in the drawings will constitute a portion of a single block. The protected portion or block of the track is provided with an insulated sub-rail 1, which obviously may be positioned either on one side of the rails or intermediate thereof, as shown in Figs. 1 and 6 respectively, and the present apparatus is designed to be mounted preferably in the cab of a locomotive, and to be brought into operation when the rail 1 is grounded to the track T, such as by the presence of one or more trains in the block, in addition to another train traveling within or entering the block, the presence of another train at a crossing, the opening of a side track switch, the washing out or injury to a bridge in the block, or the like, in a manner to be hereinafter explained.

A contact or collector wheel 2 travels on the rail 1, being carried by a hanger 3 of any suitable sort carried by the train and insulated therefrom.

The numeral 4 designates the throttle lever of a steam locomotive for controlling the flow of steam to the cylinders, but such part can be taken to typify any controlling or operating member for the power or motive agent. The throttle lever 4 swings adjacent to a segment 5, and carries a spring pressed pawl or dog 6 to engage the segment and hold the lever in any position to which it has been moved, and the pawl 6 is connected by a link 7 with a release lever 8 pivoted to the lever 4 and extending to the handle thereof, whereby the lever 8 can be grasped by the hand and moved toward the handle of the lever 4 to retract the pawl 6, and permit the throttle lever 4 to be returned to starting position to shut off the power.

In using the present apparatus, a spring 9 is connected to the lever 4 and tends to return the same to starting position, and will do so when the pawl 6 is disengaged from the segment 5 to release the lever 4.

A solenoid 10 is carried by the throttle lever 4 and its core 11 is connected to a lever 12 fulcrumed to the lever 4 and connected to the link 7, whereby when the solenoid 10 is energized to attract the core 11 thereinto, the lever 12 in being swung, will move the link 7 to retract the pawl 6 and thereby release the throttle lever, so that the spring 9 will return it to shut off the power. This movement of the link 7 is had without movement of the release lever 8 because of the slotted connection, 7′, between the two.

Switches 13 and 14 are also carried by the lever 4 and engage contacts 15 and 16 when the switches are closed, and said switches are connected by a link 17 or otherwise with the releasing lever 8, whereby when said lever 8 is held against the tension of the spring 8ª, to retract the pawl 6, the switches 13 and 14 will be opened. Said switches, however, are normally closed when the lever 8 is released, so as to be moved away from the throttle lever handle by the spring 8ª.

Figure 3:
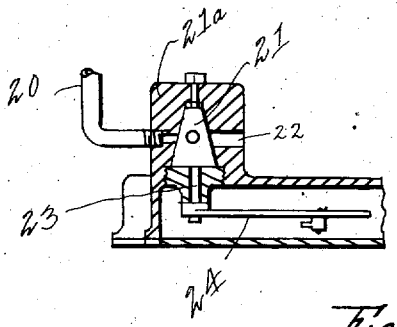
Fig. 3 is a section on the line 3—3 of Fig. 2 showing the air valve.

The numeral 19 designates the brake or train pipe which is normally charged with compressed air or pressure fluid to release the brakes, the pipe 19 being provided with a branch 20 connected to a valve casing 21ª in which a valve 21 oscillates, the casing 21ª having a port 22 opening into the atmosphere, as seen in Fig. 3. The valve stem 23 of said valve has an arm 24 to which a spring 25 is connected, thereby to normally turn said valve to closed position and preventing the escape of air at the valve.

In order to oscillate the valve 21, there is provided an electric motor 26 having secured to its armature shaft, a gear wheel 27 meshing with a larger gear wheel 28 to which a connecting rod 29 is connected. Said connecting rod is in turn connected to the arm 24 of the valve, said arm being provided with apertures 30 for the adjustable connection of the connecting rod, whereby to regulate the amount of oscillatory movement of the valve 21. When the motor is in operation, same will rotate the gear wheels 27—28 to reciprocate the connecting rod 29 and oscillate the arm 24 and the valve 21, thus opening and closing the valve to gradually bleed the air from the brake pipe, and apply the brakes gradually, thereby providing a service application thereof. The amount of oscillation of the valve 21 will control the amount that the valve is opened, and will therefore regulate the escape of air from the brake pipe.

One terminal of the motor 26 is connected by a conductor 31 with a switch 32 normally removed from its contact 33, said contact being connected by a conductor 34 with one pole of a battery 35 or other suitable source of electrical energy having its other pole connected by a conductor 36 with the other terminal of the motor 26, in order that when the switch 32 is closed, the motor 26 will operate to oscillate the valve 21. The first mentioned terminal of the motor 26 is likewise connected with the switch 32 through a branch circuit, which includes a conductor 45, electro-magnet 44, conductor 48, switch 13, contact terminal 15, conductor 47, solenoid 10 and conductor 46.

The closing of the switch 32 is controlled by a solenoid 37, the core 38 of which is connected by a link 39 with the switch 32, in order that when the solenoid is energized to pull the core 38 into it, the switch 32 will be closed. One terminal of the solenoid 37 is connected by a conductor 40 with the contact 16 which in turn is connected through the switch 14, conductor 63, binding post 53, strip 52, binding post 54, conductor 64 and conductor 36 with one pole of the battery 35. The core 38 has a stem or portion 41 to be engaged by an armature catch 42 provided with a spring 43 which normally removes the catch 42 from the stem 41. An electro-magnet 44 is arranged to attract the armature catch 42 and hold it in engagement with the stem 41 when the core 38 is moved into the solenoid 37 to close the switch 32.

Figure 4:
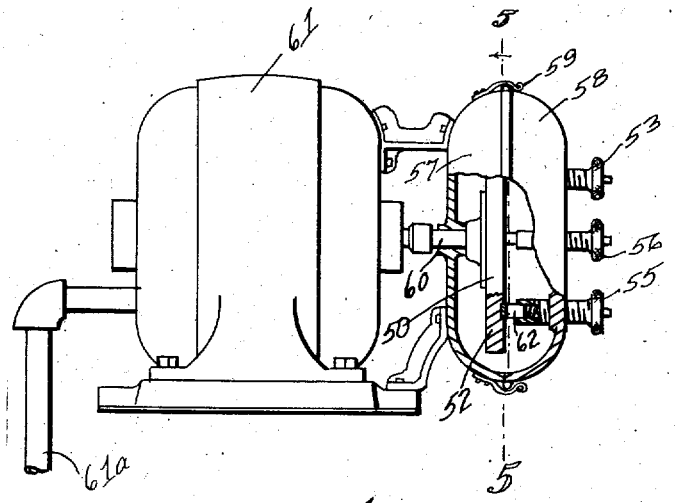
Fig. 4 is a view, showing in elevation the turbine or engine, and in section, the pole-changing switch.
Figure 5:
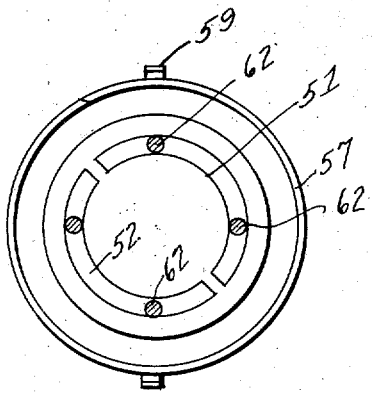
Fig. 5 is a section on the line 5—5 of Fig. 4.

A pole changer or pole changing switch 49 is provided, the same embodying a rotatable disk 50 having embedded therein the complementary arcuate strips 51 and 52, the disk 50 being of insulating material. Four equi-distant binding posts, 53, 54, 55 and 56 are arranged to be engaged in succession by the strips 51—52, the brushes having the spring pressed brush elements 62 (see Fig. 4) bearing against the face of the disk to engage said strips. The disk 50 is disposed within a casing embodying the section 57 and cap 58, (see Fig. 4) the section 57 having catches 59 (see Fig. 5) to hold the cap 58 in place, but enabling it to be removed for examination or repairs. The disk 50 has a stub shaft 60 (see Fig. 5) extending out of the section 57 and connected to a turbine 61 which may be driven by steam from the locomotive, or by any other suitable engine or prime mover, whereby the disk 50 will be rotated. The binding post 53 is connected by a conductor 63 with the switch 14; the binding post 54 is connected by a conductor 64 with the conductor 36 and the corresponding pole of the battery 35; the binding post 55 is connected by a conductor 65 to the ground; and the binding post 56 is connected by a conductor 66 with the conductor 34 and corresponding pole of the battery.

The collector wheel 2 is connected by a conductor 67 with that terminal of the solenoid 37 opposite to the terminal to which the conductor 40 is connected. That terminal of the solenoid 10 opposite to the one to which the conductor 46 is connected, is connected by a conductor 68 with the conductor 36 and corresponding pole of the battery, and the rotary disk 50 is connected to the same pole of the battery by means of the binding post 54 and conductor 64. The purpose of interposing the conductor 68 is to establish a branch circuit which will operate the solenoid 10 and release the throttle lever even though current fails to flow through the main circuit by way of the motor 26.

Figure 2:
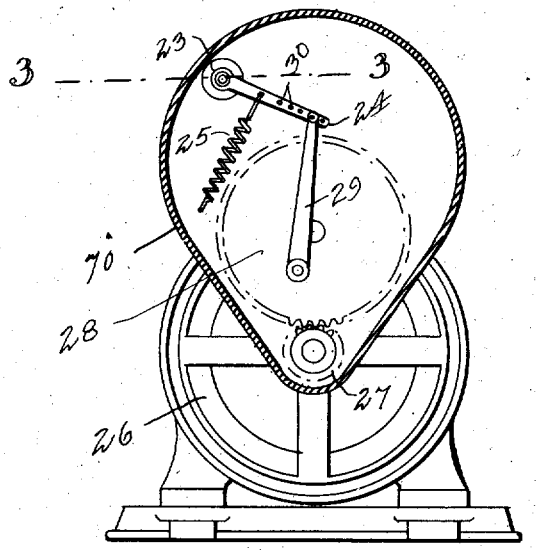
Fig. 2 is an elevation of the valve operating motor and mechanism driven thereby.

It is preferable to inclose the valve 21, motor 26, switch 32, and corresponding parts within a casing 69 to exclude dust and foreign matter, and the operating mechanism between the motor 26 and valve 21 is also preferably inclosed in the housing 70 (see Fig. 2).

When a train enters, is standing, or travels within, a clear block, the circuit of the solenoid 37 is always opened between the rail 1 and ground, the solenoid 37 is normally de-energized and the switch 32 opened by its spring 32ᵃ, thus opening the circuits of the motor 26, electro-magnet 44 and solenoid 10. Now, should the block be occupied and entered by a second train, it is evident that the circuit of the solenoid 37 of the entering train will be closed between the rail 1 and ground by the second train completing the circuit of the first train, thus providing for the flow of current over a completed circuit; or the flow of current through the circuit of solenoids 37 of the trains can be established by the grounding of the rail 1 in any other manner, such as by the presence of another train at a crossing, the damage or destruction of a bridge in the block, or the like. At any rate, supposing that the rail 1 is grounded, this will complete a circuit including the solenoid 37 and pole changer 49 on each train said pole changer serving to reverse the flow of current intermittently, whereby to assure of the flow of current in alternate directions. The pole changer 49 as above stated consists of a rotatable disc 50 attached to a turbine engine 61 which receives its energy from the boiler (not shown) of the locomotive through a pipe 61ᵃ communicating with the engine, by which means the disc 50 is rotated, the velocity of the disc depending on the steam pressure, throttle opening, friction, etc. As the steam pressure, throttle opening, friction, etc., or any one, will vary the velocity of the pole changer on any two engines, and as perfect synchronism in two moving parts can obtain only by direct connection or precise regulation, it is obvious that two pole changers, acting under these variable conditions, will act at variance with each other, with possibly a small fraction of time during which they would momentarily function identically.

By this arrangement the pole changer on one train continually reverses the current on that train and practically constantly presents a path for the flow of current whose direction is continuous through another train within the block.

This means is essential to the operation of the invention owing to a peculiar condition which exists and which will be explained by referring to the diagram in Fig. 6 in which X represents a standing train (it makes no difference, however, whether a train be standing or in motion as regards the pole changer for the turbine operates continuously without regard to the train's motion and the action of the battery is likewise independent of the motion of the train); Y is an approaching train from the rear; and Z is an approaching train from ahead.

In all three cases the polarity is identical with the direction of flow being from the positive side of the battery through the collector wheel to the sub-rail, and it is obvious that unless the polarity of one train were changed the direction of flow of any two trains would cause the two circuits to intercept on the conductor (in this case the sub-rail) and one circuit would counteract the effect of the other. But by changing the polarity as in the diagram W and designating this as one train with Z as another the flow will be from the positive side of the battery 35 to binding post 54, to binding post 53 to the wheels 100 of the first mentioned train, to track T, to the wheels 101 of the second mentioned train, to binding post 53ᵃ, to binding post 56ᵃ, to negative side of the battery 35ᵃ, through the battery to binding post 54ᵃ, to binding post 55ᵃ, to collector wheel 2ᵃ, through sub-rail 1 to collector wheel 2, to binding post 55, to binding post 56, to battery 35 thereby completing the circuit. Thus we have a continuously operating pole changer which operates to complete a circuit between two trains from either one of the trains. This assures of the energization of the solenoid 37 of each train to check the movement of the train. Thus with the pole changer 49 in the position shown in Fig. 1, the circuit of solenoid 37 includes the conductor 40, contact 16, switch 14, conductor 63, binding post 53, strip 52, binding post 54, conductor 64, battery 35, conductor 66, brush 56, strip 51, binding post 55, conductor 65, ground, circuit of other train, or other means bridging the ground and rail 1, collector wheel 2, and a conductor 67. When the disk 50 has turned, the strip 51 bridges binding posts 54 and 55, and the strip 52 will bridge binding posts 53 and 56, thus reversing the flow of current through the solenoid 37. Thus, instead of the current flowing from the conductor 63 to the conductor 65 as above indicated, it will flow along the conductor 64, the binding post 54, strip 51, binding post 55, conductor 65 to ground, the circuit of the train in advance rail 1, wheel 2, conductor 67, solenoid 37, conductor 40, contact 16, switch 14, conductor 63, binding post 53, strip 52, binding post 56, conductor 66 to the battery 35. Obviously this will reverse the flow of current, and such reversal is continued intermittently to assure of the energization of the solenoid 37, if only momentarily, but this is sufficient to draw the core 38 into the solenoid and close the switch 32. The solenoid 37 is a neutral solenoid and functions principally to operate the solenoid 10. The moment that the switch 32 is closed, it will close the circuit of magnet 44, which holds the catch 42 in engagement with the stem 41 thereby holding the switch 32 closed. Closing the switch 32 establishes the following circuits: Current will flow from one pole of the battery 35 and divide between the conductors 36 and 68. That portion of the current flowing through the conductor 36 will pass through motor 26, conductor 31, and again divide, a portion going through switch 32 and conductor 34 to the battery 35; the other portion flowing through conductor 45, electro-magnet 44, conductor 48, switch 13, contact 15, conductor 47, solenoid 10, conductor 46, switch 32, and conductor 34 to the battery 35. That portion of the current flowing through conductor 68 will pass through solenoid 10, conductor 46, switch 32, contact 33 and conductor 34 to the battery 35. The closure of the motor circuit rotates the motor 26 to oscillate the valve 21 and allow the air to gradually escape from the brake pipes to apply the brakes and prevent the train from coasting too far, and also energizes the solenoid 10 to draw the core 11 into it, and release the throttle lever 4 by withdrawing the pawl 6 from the segment 5 so that the spring 9 will return the throttle lever to initial position, to shut off the power which propels the vehicle or train.

Should the engineer or operator desire to proceed under caution conditions, by grasping the lever 8 and handle of the throttle lever 4, and moving the lever 8 toward the throttle lever handle; this will not only retract the pawl 6 if it is not already retracted, but will also open the switches 15 and 14. The switch 15 is in the circuit of magnet 44 as above indicated, and said switch in being opened, will open the circuit of said magnet, thereby releasing the catch 42 which will in turn release the core 38, so that the spring 32[a] will open the switch 32. The circuit of the solenoid 37 is opened by the opening of the switch 14 and the switch 32 being opened, will open all three circuits thereof, and the switch 14 being opened by the lever 8, the circuit of solenoid 37 will remain open, so that said solenoid cannot be energized as long as the switch 14 is opened, even though danger conditions exist. The motor 26 being stopped will result in the valve 21 being closed by the spring 25, whereby the air will accumulate in the brake system to release the brakes, and the operator now having control of the power, can proceed with caution, his hand being on the throttle lever and releasing lever 8, in order that the power can be shut off immediately when necessary, it being noted that when the lever 8 is held to open the switches 13 and 14, this removes the pawl 6 from the segment 5, so that the spring 9 tends to return the lever. The operator must therefore exert continued force to prevent the spring 9 from returning the throttle lever, when running under caution conditions, thus preventing the engineer from being neglectful, for otherwise the train will again be stopped.

Having thus described the invention, what is claimed as new is:—

1. In a train controlling apparatus, a compressed air brake pipe, a valve for controlling the release of the air within the air brake pipe, an electric circuit, a motor in said electric circuit, an eccentric operated by the motor, said eccentric having connection with the valve for intermittently operating the valve to gradually release the air in the air brake pipe, and means for adjusting the connection between the eccentric and valve to regulate the movement of the valve.

2. In a train controlling apparatus, a compressed air brake pipe, a valve for controlling the release of air within the air brake pipe, an electric circuit, a motor in said electric circuit for controlling movement of the valve, a magnet including a catch, for controlling the operation of the motor, a switch member for controlling the circuit to the magnet, a solenoid having connection with the switch for moving the same into and out of operation, said solenoid including a catch, the first mentioned catch adapted to engage the second mentioned catch to lock the switch member in its operative position.

3. In a train controlling apparatus, in combination, a compressed air brake pipe, a valve for controlling the release of the air within the air brake pipe, an electric circuit, a continuous operating rotating pole changer in said circuit, steam actuated means for driving said pole changer, a motor in said electric circuit, an eccentric operated by the motor, said eccentric having connection with the valve for intermittently operating the valve to gradually release the air in the air brake pipe, and means for adjusting the connection between the eccentric and valve to regulate the movement of the valve.

In testimony that we claim the foregoing as our own, we have hereto affixed our signatures.

EDWARD H. OLSON.
JAMES C. H. CLARK.
MERL B. MEALEY.
CHARLES PELTER.